Figure 1:
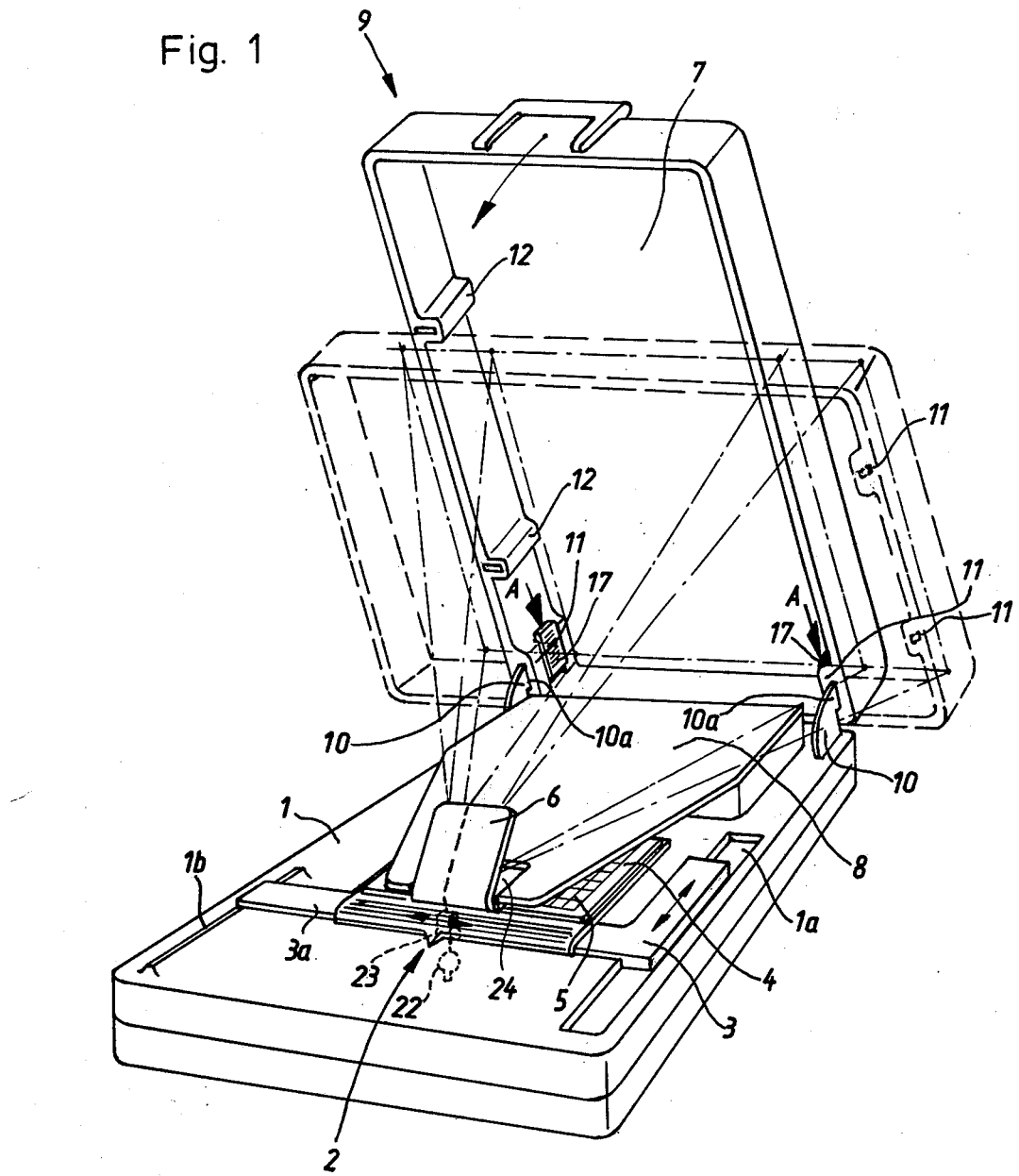

United States Patent [19]

Hofmann et al.

[11] 4,131,348

[45] Dec. 26, 1978

[54] COLLAPSIBLE MICROFILM READER

[75] Inventors: Wilfried Hofmann; Guenther Leuder, both of Taufkirchen; Walter Rauffer, Munich; John Krueger, Munich; Adolf Koopmann, Munich, all of Fed. Rep. of Germany

[73] Assignee: Agfa-Gevaert AG., Leverkusen, Fed. Rep. of Germany

[21] Appl. No.: 791,471

[22] Filed: Apr. 27, 1977

[30] Foreign Application Priority Data

Apr. 27, 1976 [DE] Fed. Rep. of Germany ....... 2618470

[51] Int. Cl.² ............................................. G03B 21/30
[52] U.S. Cl. ......................................... 353/72; 353/79
[58] Field of Search .................. 353/27 R, 71, 72, 73, 353/77, 78, 79, 119

[56] References Cited

U.S. PATENT DOCUMENTS 2,506,169  5/1950  Perillo .................................. 353/119

Primary Examiner—Steven L. Stephan

[57] ABSTRACT

A collapsible microfilm reader having a lower body part with a micro-fiche projector and a cover hinged thereto and having a rectangular projection surface or screen on its inner surface which is operatively positioned when the cover is in its open position. The hinge or hinges which connect the body and cover are readily disconnectable and connectable so that the cover can selectively be mounted on the body with the long or short axis of the screen aligned with the central axis of the projector thereby permitting the optimum projection of micro-fiches of different formats by changing when necessary the orientation of the positioning of the cover on the body rather than requiring different positioning of micro-fiches of different formats with respect to the projector.

5 Claims, 2 Drawing Figures

COLLAPSIBLE MICROFILM READER

This invention relates to a collapsible microfilm reader with a lower body having a projector, and an upper cover which includes a projection surface or screen, the cover being pivotally mounted on the body. The screen is operatively positioned for projection thereon when the cover is swung to its fully-open position.

Microfilm readers of this type, which are generally designed as portable readers with cases, should on the one hand be of the smallest possible dimensions and therefore easy to handle, but on the other hand they should also provide adequate facility of reading the microfilms. In particular, users demand a size for the projected micro-image which is sufficient to permit reading with a minimum of effort.

Since, however, the projection surface of a portable reader is relatively small, care must be taken to see that the projection surface is fully utilized even for individual frames of the microfilm which are employed to display the variety of formats in use today.

This can be achieved by providing the user with several lenses of various focal lengths, so that for each microfilm format he can use that lens through which the micro-image is projected with the best possible use of the available projection surface. The use of several lenses, however, has the disadvantage that the equipment becomes relatively expensive and the set of lenses must be stored and cared for.

The invention has as a principal object the provision of a portable microfilm reader used with various micro-image formats which makes optimal use of the projection surface available, without relying upon several lenses.

The invention therefore provides a releasable hinge connection between the cover of the reader and the body thereof. The hinge connection has a first connecting element connected to the cover and a second mating connecting element connected to the body; a first side edge of one of the two side edges of the cover that is perpendicular to the first side edge having the first connecting element has at least one further third connecting element which is identical with the first connecting element. In this way the hinge connection that is ordinarily provided at the rear of the reader between the rectangular hollow cover and the body can be released, the cover can be turned through a 90° angle and fastened again to the body in this rotated position. As a result, the rectangular projection surface contained on the inner surface of the cover can be used in a vertical or horizontal position, as desired. It is thus possible, for example, using a single lens and with optimum utilization of the projection surface, to scan both micro-images in the A4 format (NMA standard) and the comparatively larger images of the COM format. For images in the A4 format the projection surface is used with its longer dimension in the vertical position; when looking at images in the COM format, which have a horizontal format, the cover is placed in its horizontal position after being turned through 90° and remounted on the body.

As a particularly simple and cost-saving feature, the invention also has a hinge joint which is fastened to the body of the reader and a recess formed in the cover to receive a tongue of the hinge joint. The cover containing the projection surface is then placed in the desired position according to the desired format on the hinge joints fastened to the body, by means of the recesses provided in one of the long sides or one of the short sides of the cover, as the case may be.

The invention further provides a rocking lever on a stationary pivot pin mounted on the body, and a locking device disposed on this lever at a distance from its pivotal axis. The locking device interacts with one of the walls of the housing of the body. In this way the cover containing the projection surface can be easily locked in its open, operating position.

Still another advantageous feature of the invention is the provision of a locking device on the cover that holds the tongue or tongues of the hinge joint fast in their recesses. In particular, there can be added a slide mounted on the upper part with a locking bolt that fits into a recess in the tongue, so that the releasable connection between the cover and body is locked, particularly when the device is closed.

An illustrative preferred embodiment of the invention is described below and explained more precisely with the aid of the accompanying drawings.

Figure 2:
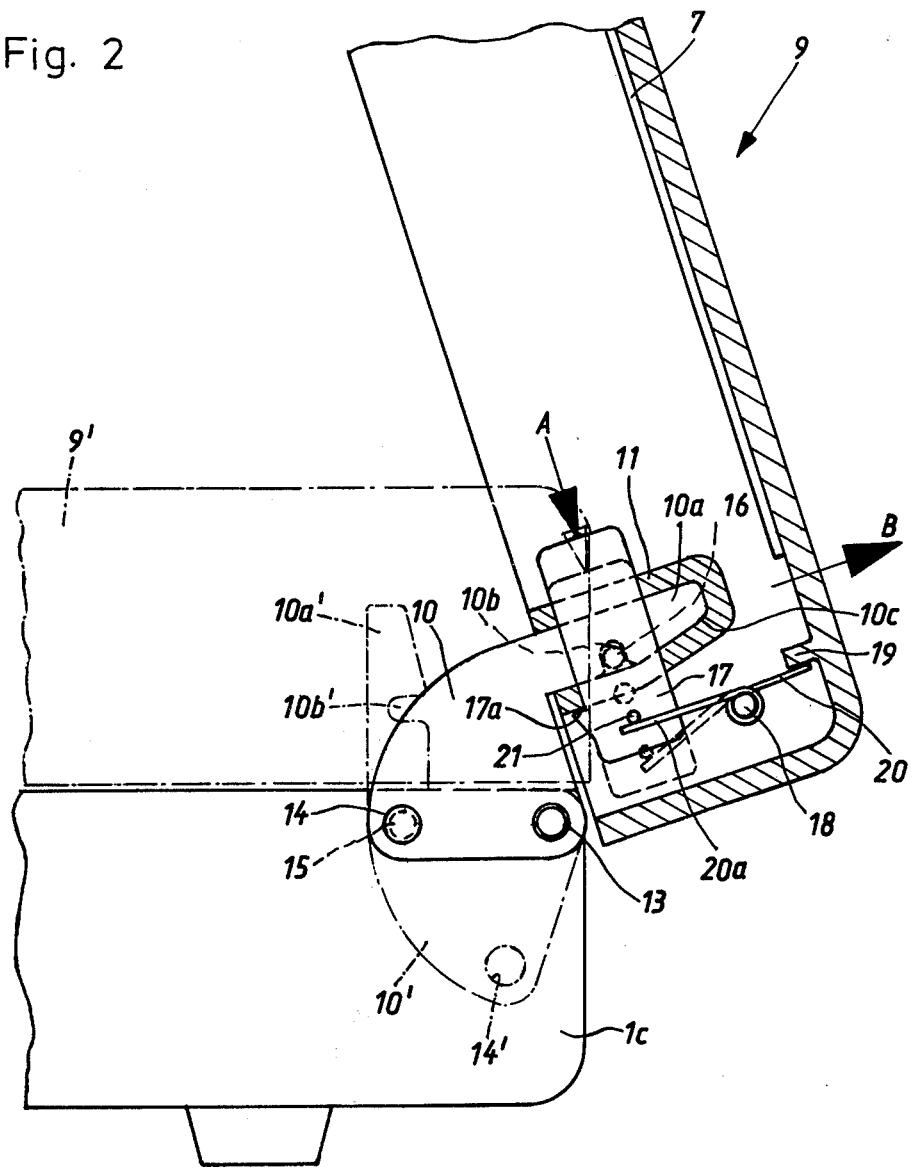

In the drawings:

FIG. 1 is a semi-schematic view in perspective of a microfilm reader in accordance with the invention; and FIG. 2 is a view in side elevation of the hinge connection between the cover and body of the reader, the movable part of the hinge connection being shown in full lines in the position which they occupy when the cover is fully open, and in phantom lines in the position it occupies when the cover is closed.

Turning now to FIG. 1, on the housing of the body of a collapsible microfilm reader in a carrying case there is mounted a right-angled guide bar 3 in a guide groove 1a so that it can move along the length of the housing. On this guide bar 3, which rests upon a bar 1b on the housing, there is slidably mounted a film stage 2. The film stage can thus be moved along part 3a of the guide bar 3 transversely of the housing. This film stage holds a micro-fiche 5 between two transparent plates 4. The microfilm frame of the micro-fiche that is to be viewed can be brought into the beam emitted from a source of light 22 and passing through a lens 23 by moving the film stage. By means of the lens 23 and a deflection mirror 6, a micro-image is formed on the projection surface 7. The deflection mirror 6 is mounted on a plate 8 attached firmly to the body part 1 of the device and when the cover 9 is closed it is folded in a manner not shown here in detail into a horizontal position parallel to the cover plate 8. One way in which the mirror may be folded is described in the co-assigned application Ser. No. 791,472, filed 4/27/77.

The cover 9 which contains the projection surface 7 is hinged to the body 1 by means of rocking levers 10 having tongues 10a which are inserted in recesses 11 in bosses on the side of the cover. A further pair of similar recesses 12 in bosses is provided in one of the long sides of the hollow cover.

In FIG. 2, one of the hinge connections that joins the cover and the body of the device is shown in detail. A rocking lever 10, with a tongue 10a having a triangular-shaped free end, is mounted to rotate on a pivot pin 13 fastened to a side wall 1c of the lower housing 1 of the device. A locking knob 14 is mounted on the rocking lever 10; when the rocking lever is in the full-line position shown in FIG. 2, knob 14 locks into a locking recess 15 provided in the side wall 1c.

The tongue 10a of the rocking lever, which is inserted in the recess 11, is secured in its inserted position by means of a locking bolt 16 that fits into a recess 10b in the tongue. This locking bolt 16 is fastened to a slide 17 mounted on the cover and is held by the force of a spring in its locking position. For this purpose a spring clip 20 is mounted upon a pin 18 fastened to the cover, one wing 20 of the spring clip abutting a projection 19 on the cover. The other wing 20a of the spring clip presses against a pin 21 fastened to the slide 17, thereby forcing the slide upwardly into the locking position. A projection 17a on the slide 17 limits the upward movement of the slide under the pressing force of the spring.

The position of lever 10 when the cover 9 is closed is shown in phantom lines in FIG. 2, wherein the parts are designated by the same reference characters with phantom lead lines. To put the device in operation, the cover 9 is rotated upward in clockwise fashion from its closed position until the locking knob 14 locks into the locking recess 15. This puts the projection surface 7 into its nearly vertical operating position. In this position micro-images of the customary format, e.g., format A4 (NMA standard) can be projected. However, if micro-images in the COM format are to be viewed, the breadth of the projection surface in the vertical position will be insufficient. The cover must therefore be rotated 90° in its plane.

For this purpose, the user grasps the cover on the lower portion of both side walls and presses the slide 17 downward with both thumbs in the direction of arrow A. By this means the locking bolts 16 release the tongues 10a, so that the cover can be removed in a backward direction corresponding to arrow B. Now the cover is rotated 90° in its plane and replaced on the tongues 10a now using the recesses 12. The projection surface 7 is then in its horizontal position on the device, so that now even images in the COM format can be completely formed on the projection surface.

To close the device, the cover is again rotated 90° in its plane and placed on the tongues 11a, using the recesses 11. By this means, owing to the inclined lower edge 10c of the tongue 10a, the locking pin 16 is automatically thrust downward by the wedge effect of the tongue 10a in opposition to the force of the spring 20, and snaps in to the recess 10b when the cover has been mounted completely on the hinges, so that this means the tongue connections of the hinges are automatically locked.

Although the invention has been illustrated and described with reference to a single preferred embodiment thereof, it is to be expressly understood that it is in no way limited to the disclosure of such a preferred embodiment, but is capable of numerous modifications within the scope of the appended claims.

What is claimed is:

1. In a collapsible microfilm reader with a body containing a projector, the reader having a rectangular cover containing a projection surface which is longer in one direction of the cover than the other, the cover being hingedly attached to the body, the improvement which comprises at least one releasable hinge connection between the body and the cover, the hinge connection having a first connecting element connected to the body and a second, mating connecting element connected to a first edge of the cover, and at least one further third connecting element similar to the second connecting element on one of the sides of the cover that is perpendicular to said first edge thereof.

2. A collapsible microfilm reader as in claim 1, wherein a hinge joint having a tongue is fastened to the body and recesses are formed in the cover to receive the tongue of a hinge joint.

3. A collapsible microfilm reader as in claim 2, wherein the body has a housing, the hinge part comprises a rocking lever mounted to rotate on a pivot pin fixed to the body of the device, and a locking device is mounted on the rocking lever eccentric of its axis, such locking device interacting with one of the walls of the housing of the body of the device.

4. A collapsible microfilm reader as in claim 2, wherein on the cover there is provided a locking mechanism that holds the tongue of the rocking lever firmly in its recess.

5. A collapsible microfilm reader as in claim 4, wherein the locking mechanism comprises a slide mounted on the cover, said slide being provided with a locking bolt that fits into a recess in the tongue of the rocking lever.

* * * * *